Jan. 14, 1930. F. H. HOPKINS 1,743,350
SPRING ADJUSTMENT FOR VALVES, ETC
Filed Sept. 13, 1926
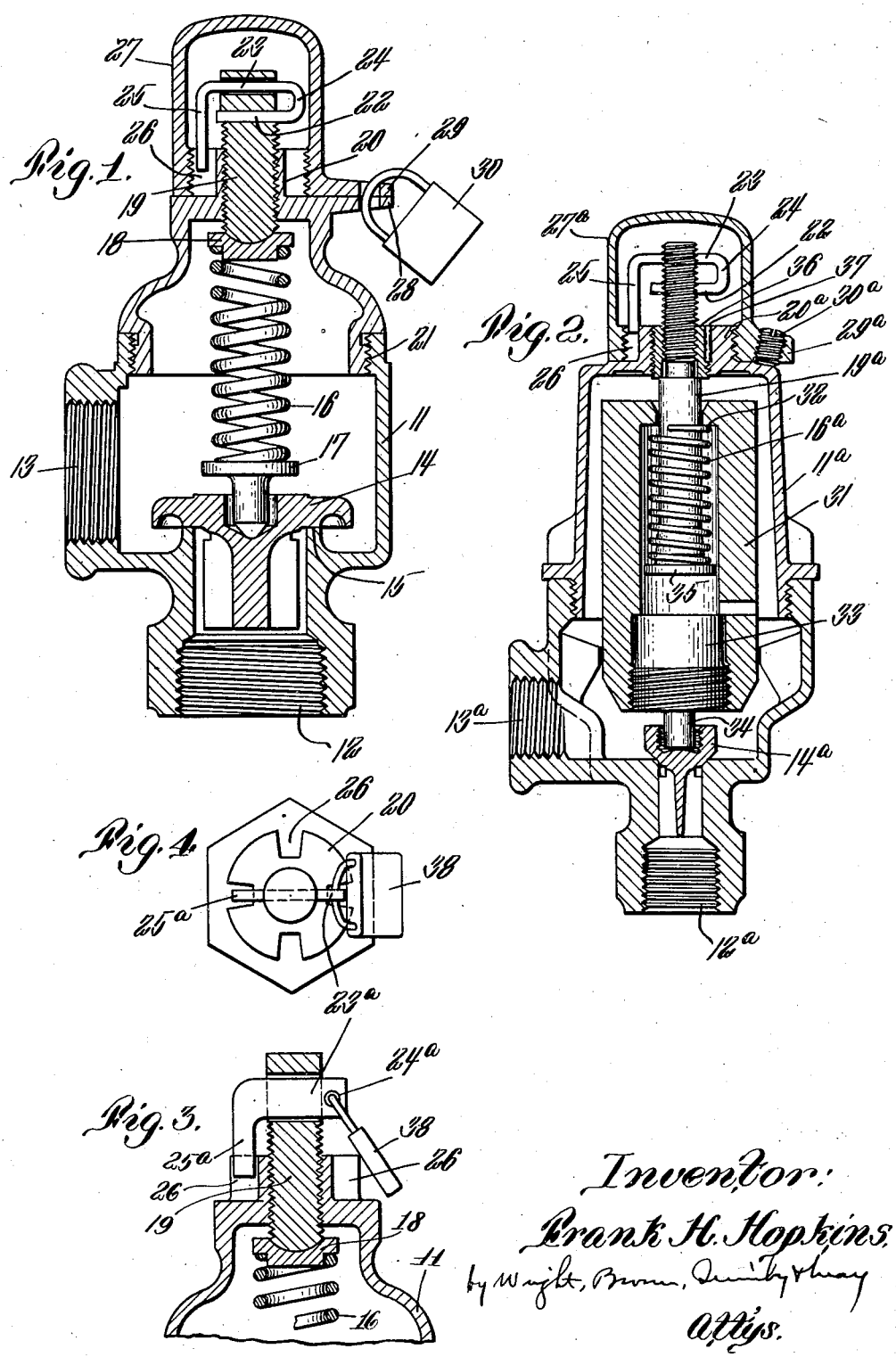
Inventor:
Frank H. Hopkins,
by Wright, Brown, Quinby & May
Attys.

Patented Jan. 14, 1930

1,743,350

UNITED STATES PATENT OFFICE

FRANK H. HOPKINS, OF ARLINGTON, MASSACHUSETTS, ASSIGNOR, BY MESNE ASSIGNMENTS, TO CONSOLIDATED ASHCROFT HANCOCK COMPANY, INC., OF NEW YORK, N. Y., A CORPORATION OF DELAWARE

SPRING ADJUSTMENT FOR VALVES, ETC.

Application filed September 13, 1926. Serial No. 135,078.

This invention relates primarily to valves in which a spring is employed to influence the closing and opening movements of the valve member, and it is particularly concerned with means for adjusting the tension of the spring so employed and for securing and locking the adjusting means. The invention consists in the combination with the valve and a rotatably adjustable stem or equivalent abutment, on which the valve spring reacts, of displaceable locking means of special character adapted to be set so as to prevent displacement of the stem or abutment from its adjusted position. In another aspect, the invention consists in the combination of such locking means with a rotatably adjusting stem or the like adapted for various uses.

In its application to the uses of spring loaded valves, or weight loaded and spring relieved valves, the lock cooperates between a rotatably adjustable screw threaded stem and a casing in which such stem is mounted, and is itself prevented by retaining means from being displaced. In the following specification, and in connection with the drawings, I have described illustratively two forms of lock embodying the invention in combination with two types of valve.

In the drawings,—

Fig. 1 is a sectional view of a spring loaded valve containing this invention;

Fig. 2 is a similar view of a weight loaded valve having a counteracting spring and adjusting means therefor embodying the invention:

Fig. 3 is a sectional view of a modified form of lock applicable to either of the valves above mentioned;

Fig. 4 is a plan view of the lock shown in Fig. 3.

Like reference characters designate the same parts wherever they occur in all the figures.

The valve chosen for illustration in Fig. 1 is a relief valve having a body or casing 11 with an inlet at 12, and an outlet at 13, and containing a valve proper 14 arranged to close on a seat 15 surrounding the inlet passage. This valve is spring loaded by a spring 16 pressing on the valve proper through a foot 17 and reacting through a flanged disk 18 against an adjustable screw threaded stem or abutment 19, which engages the threads of a tapped hole in the end wall or head 20 of the valve body. Thus, by rotating the screw stem 19 in one direction or the other, the pressure exerted by the spring on the valve proper may be increased or diminished. The adjustments so effected are maintained by a lock of peculiar character, which more particularly forms the subject matter of this invention.

It will be noted from the drawing that the valve body is made of two parts connected together by means of a screw joint 21 and separable so as to permit insertion of the valve body and spring. But its details of construction are unimportant.

The lock shown in Figs. 1 and 2 is formed of stiff wire or rod stock bent into U-shape with legs of unequal length, and the longer leg is further bent more or less nearly at right angles and preferably in the same plane with the other leg. This formation provides the locking member with two guides 22 and 23, a loop 24 connecting them and a tongue portion 25. The guides 22 and 23 are inserted through complemental parallel transverse holes in the end portion of the stem 19 which is designed to protrude outside of the valve casing, and the tongue 25 lies beside the stem and projects toward the body. The lock member may be thus mounted in the stem before the end part which provides the tongue 25 is bent down. The distance between the tongue 25 and loop 24 is wider than the stem 19 by an amount sufficient to permit movement of the lock as a whole and displacement of the tongue 25 from the stem far enough to pass out of the complemental notches in the valve body.

The outer part of the end wall or head 20 of the valve body is provided with one or more notches 26, a suitable number, arrangement and form of which is shown in plan by Fig. 4. The surface of the head intermediate the notches is preferably cylindrical, and at any rate does not extend as far at any point from the stem as the distance to which the locking tongue 25 may be withdrawn from the stem. Thus when the tongue is withdrawn from the slots, the stem may be rotated, and then the tongue may be placed in one of the notches.

Various means may be provided for retaining the locking tongue in any notch wherein it may be placed. One such means is shown in Figs. 1 and 2, and consists of a cap 27 in screw threaded detachable connection with the notched extremity of the head 20. Another form is shown in Figs. 3 and 4 and will be later described. Removal of the cap 27 enables the lock to be moved out of the notch containing it and the stem to be rotated. While I have shown here a complete cap, designed to enclose the lock and the protruding end of the stem, and to make a leakage tight joint with the valve body, it is evident that a complete cap is not necessary to serve the function of retaining the locking tongue, but this function is performed by the part of the cap which surrounds the threaded end of the valve casing head. To all intents and purposes then, so far as the function now being considered is concerned, the lock retainer is a ring embracing the part of the head in which the locking notches are contained and covering the ends of the notches. The ring may also be considered as a gate for the notches.

To prevent removal of the retainer ring or gate by unauthorized persons, I have provided overlapping lugs or flanges 28 and 29 on the valve body and cap or ring, such lugs having holes adapted to be placed in register, through which the hasp of a padlock 30 may be passed. Thus a triple lock is provided for securing adjustments of the spring abutments; namely, the locking tongue 25 and notches 26, the retainer 27 which holds the lock in any one of the notches, and the padlock 30, which prevents removal of the retainer. In place of a padlock as the third locking means, other equivalent contrivances may be used, one of which is shown in Fig. 2 and will presently be described.

Fig. 2 illustrates the application of this invention to a weight loaded valve in which the load of the weight is more or less diminished by an adjustable spring. Here 11ª represents the valve casing 12ª the inlet, 13ª the outlet, and 14ª the valve proper. A weight 31 furnishes the loading by which the valve is normally closed. Said weight has a central passageway surrounded near its upper end by an internal shoulder 32 adapted to take the reaction of a spring. The lower end of the passage in the weight is closed by a plug 33 having a stem 34 projecting so as to bear on the valve proper.

The spring 16ª in this case surrounds a stem 19ª and is confined between the shoulder 32 and a flange 35 on the end of the stem. The stem passes from the interior of the weight through the end thereof and also through the end wall or head 20ª of the valve casing, being threaded in a bushing 36 which is screwed into the head 20ª and is secured by a key 37.

The spring 16ª balances the weight in greater or less measure according to the adjustment of the stem 19ª; and the limits of adjustment may, if desired, be made wide enough to enable the weight to be entirely supported by the spring or to press on the valve proper without any diminution whatever.

The lock shown here is substantially identical with that shown in Fig. 1 and previously described, and its parts are designated by the same reference characters there used. The head 20ª of the valve casing is provided with notches 26 similar to those described, and a cap 27ª or equivalent ring or gate is applied to the head so as to cover the notches. An alternative lock for securing the retainer in place is here shown as consisting of a set screw 30ª threaded into a flange or lug 29ª on the cap and adapted to bear against an adjacent surface of the valve casing.

A valve of the sort last described is particularly well adapted for use in connection with a conduit conveying oil or other liquid from a tank to a burner or other recipient at a level lower than that of the tank, serving in this use as an anti-siphon valve to prevent continued flow of the oil by syphonic action after the suction pump has been shut down. The force exerted by the weight is adjusted by means of the adjustable spring so that it will prevent the valve being lifted by the oil head alone, but will permit it to lift when the pressure due to the oil head is augmented by a suction pump. If different conditions of oil head require the weight to be made effectively heavier or lighter, it may be made so by adjusting the stem 19ª, after which the adjustment is secured by the lock 25.

Figs. 3 and 4 show a modified form of lock for the spring abutment stem, and an alternative lock retainer. In this case the lock is made from heavy sheet metal, or other material of a similar nature, and is cut with an L or angle shape to form a guide part 23ª and a tongue part 25ª. The guide part passes through a transverse slot in the spring abutment stem 19 and is of suitable outline in cross section to be held therein without possibility of rotation but capable only of moving endwise. An eye 24ª is formed in the outer end of the guide part and is adapted to receive the hasp of a padlock 38 or equivalent filler or stop, which serves as a retainer to prevent withdrawal of the tongue from any of the notches 26 in which it may be set. The use of a padlock 38 as a lock retainer makes unnecessary the provision of an external cap or rim for that purpose. The eye 24ª which receives the hasp of the padlock is equivalent to the loop 24 shown in Figs. 1 and 2.

It will be evident that such a padlock or equivalent filler could be inserted in the loop shown in either of these figures in substitution for the cap 27, so far as concerns merely the lock retaining function of such cap.

It will be understood that the form or arrangement of the notches 26 shown in Fig. 4, although said figure is a plan view of the construction shown in Fig. 3, is or may be the same as of the notches in the construction shown by Figs. 1 and 2. Four notches equally spaced are here indicated; but it is apparent that the number of notches is immaterial and that there may be any number from one up to the limit permitted by the dimensions of the valve-body head and the locking tongue, and the strength of the materials of which these parts are made.

An important advantage of valves having the characteristics hereinbefore described is that these characteristics provide means for increasing or decreasing the pressure control of the valve by a known amount for each turn, or fraction thereof, of the spindle. When such a valve is designed and applied for use, for example, as an anti-siphon device in a pipe line for conducting oil from a tank to a burner at a lower level than the tank, one complete turn is equal to a given head of oil, depending on the stiffness of the spring. I have found it convenient for this specific use to make the pressure increment or decrement due to one rotation of the stem equal to a two-foot head of oil. By means of this invention a known change in the pressure controlling effect of the valve may be made without need of subjecting it to an actual test. This is an important feature of utility when the circumstances make it impossible or inconvenient to retest the valve for a new setting of pressure.

A lock substantially like that herein described, and its retainer, may be applied to other uses and combinations wherein it is desired to lock a screw stem or other rotatable part. Hence the broadest scope of the protection which I claim is not limited to the combination and use with a valve; although I claim as new and desire to protect the improvement in valves of the type described, which consists in applying the lock herein described to the spring stem or abutment of such a valve.

What I claim and desire to secure by Letters Patent is:

1. A supporting structure having a screw threaded passageway and an open notch at one side of said passageway, a threaded stem occupying, and rotatable in, said passageway, said stem having a transverse passage, a locking member occupying the passage in the stem and being movable endwise therethrough, said member having a tongue beside the stem arranged to enter said notch, and to be withdrawn therefrom, by its movement in the stem, and a displaceable lock retainer adapted to prevent such withdrawal of the lock.

2. A supporting structure having a screw threaded passageway and an open notch at one side of said passageway, a threaded stem occupying, and rotatable in, said passageway, said stem having a transverse passage, a locking member occupying the passage in the stem and being movable endwise therethrough, said member having a tongue beside the stem arranged to enter said notch and to be withdrawn therefrom by its movement in the stem, a displaceable lock retainer adapted to cover said notch, and a lock for holding said retainer in its notch covering position.

3. A valve comprising a casing having a head provided with a screw threaded passage, and a valve proper in said casing, a spring within said casing adapted to influence the opening and closing of the valve proper, an abutment stem for the spring rotatably mounted in the passage in said head, the head having a notch at one side of the passage, and a locking member extending transversely through the stem and movable transversely therein, said locking member having a tongue extending beside the stem and adapted to be moved into and out of said notch.

4. A valve comprising a casing having a head provided with a screw threaded passage, a valve proper in said casing, a spring within said casing adapted to influence the opening and closing of the valve proper, an abutment stem for the spring rotatably mounted in the passage in said head, the head having a notch at one side of the passage, a locking member extending transversely through the stem and movable transversely therein, having a tongue extending beside the stem and adapted to be moved into and out of said notch, and a lock retainer displaceably engageable with the lock for preventing withdrawal of the tongue thereof from said notch.

5. A valve comprising a casing having a head provided with a screw threaded passage, a valve proper in said casing, a spring within said casing adapted to influence the opening and closing of the valve proper, an abutment stem for the spring rotatably mounted in the passage in said head, the head having a notch at one side of the passage, a locking member extending transversely through the stem and movable transversely therein, having a tongue extending beside the stem and adapted to be moved into and out of said notch, a retaining gate displaceably covering the open side of said notch, and a lock for holding said gate in position to close the notch.

6. A valve comprising a casing having a head provided with a screw threaded passage, a valve proper in said casing, a spring within said casing adapted to influence the opening and closing of the valve proper, an abutment stem for the spring rotatably mounted in the passage in said head, the head having a notch at one side of the passage, a locking member extending transversely through the stem and movable transversely therein, having a tongue extending beside the stem and adapted to be moved into and out of said notch, and a ring displaceably surrounding that portion of the head in which the notch is formed and closing the open side of the notch to prevent withdrawal of said tongue therefrom.

7. A valve comprising a casing having a head provided with a screw threaded passage, a valve proper in said casing, a spring within said casing adapted to influence the opening and closing of the valve proper, an abutment stem for the spring rotatably mounted in the passage in said head, the head having a notch at one side of the passage, a locking member extending transversely through the stem and movable transversely therein, having a tongue extending beside the stem and adapted to be moved into and out of said notch, a ring displaceably surrounding that portion of the head in which the notch is formed and closing the open side of the notch to prevent withdrawal of said tongue therefrom, and a lock engaging with the ring and casing for holding the ring in its notch closing position.

In testimony whereof I have affixed my signature.

FRANK H. HOPKINS.